United States Patent [19]

Hong

[11] Patent Number: 5,315,452
[45] Date of Patent: May 24, 1994

[54] APPARATUS AND METHOD FOR AUTOMATICALLY ADJUSTING RECORDING SPEED OF A RECORDER

[75] Inventor: Kwon-pyo Hong, Suwon, Rep. of Korea

[73] Assignee: Samsung Electronics Co., Ltd., Kyunggi-do, Rep. of Korea

[21] Appl. No.: 847,290

[22] Filed: Mar. 10, 1992

[30] Foreign Application Priority Data

Apr. 29, 1991 [KR] Rep. of Korea .................. 91-7068

[51] Int. Cl.$^5$ ............................................. G11B 15/46
[52] U.S. Cl. .............................. 360/73.07; 360/73.08; 358/335
[58] Field of Search ............... 360/73.01, 73.07, 73.14, 360/73.08, 27, 33.1; 358/908

[56] References Cited

U.S. PATENT DOCUMENTS

| 4,641,205 | 2/1987 | Beyers, Jr. ................. | 360/33.1 |
| 4,931,877 | 6/1990 | Gebhard et al. ........... | 360/27 |
| 5,117,316 | 5/1992 | Kim .............................. | 360/73.07 |

FOREIGN PATENT DOCUMENTS

| 0064647 | 5/1980 | Japan ......................... | 360/73.01 |
| 0165970 | 12/1981 | Japan ......................... | 360/73.14 |
| 0257025 | 11/1986 | Japan ......................... | 360/33.1 |
| 0195576 | 8/1990 | Japan ......................... | 360/73.01 |

Primary Examiner—Edward K. Look
Assistant Examiner—Christopher Verdier
Attorney, Agent, or Firm—Sughrue, Mion, Zinn, Macpeak & Seas

[57] ABSTRACT

An apparatus and a method for automatically adjusting the recording speed of a recorder, such as a video cassette recorder (VCR) are provided, wherein the recording speed is automatically changed by comparing the remaining length of a recording medium such as a tape with the remaining recording time of a program, thereby enabling the program to be recorded without interruption. The apparatus includes a reel rotation sensing device for sensing the states of a take-up reel and a supply reel, data input device for inputting data and setting a mode, a memory for storing the data input from the data input device, a system-control microcomputer for calculating a remaining tape length in accordance with the output signal from the reel rotation sensing device, and outputting a signal for controlling the tape's recording mode by comparing the remaining tape length with the data recorded in the memory, and a servo microcomputer for driving motors in accordance with the control signal from the system-control microcomputer.

11 Claims, 3 Drawing Sheets

APPARATUS AND METHOD FOR AUTOMATICALLY ADJUSTING RECORDING SPEED OF A RECORDER

BACKGROUND OF THE INVENTION

The present invention relates to an apparatus and method for automatically adjusting the recording speed of a recorder such as a video cassette recorder (VCR), wherein the recording speed is automatically changed by comparing the remaining length of a recording medium such as a tape with the remaining time of a program that is being recorded, thereby continuously recording the program.

In conventional VCRs, the recording speed such as SP, LP, or SLP is selected by a user in a normal recording function for directly recording the current broadcast signals, or a reserved (programmed) function for recording a desired program at a pre-programmed time using a timer. Once selected, the recording speed is maintained until completion of the recording unless the selected speed is changed. Therefore, when the broadcasting time of a program to be recorded is longer than that of the remaining tape which will be recorded, conventional recording is disadvantageous in that latter portions of the program to be recorded cannot be recorded due to the lack of tape, which thus results in an incomplete recording.

Several techniques have been proposed to overcome these disadvantages, which however, are insufficient to present a satisfactory solution.

More specifically, it is known to form an indicating groove in the cassette tape housing according to its tape length, i.e., for 30, 60, or 120 minutes. When a video cassette tape with the indicating groove is loaded, the programmed recording time is determined in the VCR by sensing the indicating groove, and then the recording speed is automatically set by comparing the kind of tape with the programmed recording time. However, this technique is used only for the reserved (programmed) recording function. Moreover, the indicating groove must be formed in the video cassette tape, which required an indicating groove sensing device in the VCR.

In addition to the above technique, a technique is suggested that the remaining tape is calculated by sensing a take-up reel pulse and a supply reel pulse, which in turn are converted into analog voltages to be compared with a preset voltage, thereby changing the recording speed. However, since the recording speed changing point is adapted by detecting an analog voltage in accordance with a preset value, malfunction frequently occurs when a inaccurate reference voltages are set by the user.

SUMMARY OF THE INVENTION

The present invention is devised to solve the above problems. Therefore, it is an object of the present invention to provide an apparatus and a method for automatically adjusting the recording speed of a recorder such as video cassette recorder (VCR), wherein the recording speed is automatically changed by comparing the remaining recording time of a program, thereby enabling the program to be recorded without interruption.

It is another object of the present invention to provide an apparatus and a method for automatically adjusting the recording speed of a VCR, by comparing the remaining length of a tape and the remaining time for recording during not only a normal recording but also a reserved recording mode, without requiring a reference voltage set by a user.

It is still another object of the present invention to provide an apparatus and a method for automatically adjusting the recording speed of a VCR, which can give a warning when the remaining length of a tape is short when recording at the slowest speed during normal or reserved recording.

To achieve these and other objects of the present invention, there is provided an apparatus for automatically adjusting the recording speed of a VCR comprising:

reel rotation sensing means for sensing the states of a take-up reel and a supply reel;

data input means for inputting data and setting a mode;

a memory for storing the data input from the data input means;

a system-control microcomputer for calculating a remaining tape length in accordance with the output signal from the reel-rotation sensing means, and outputting a signal for controlling a recording mode of the tape by comparing the remaining tape length with the data stored in the memory; and a servo microcomputer for driving motors in accordance with the control signal from the system-control microcomputer.

Also, there is provided a method for automatically adjusting the recording speed of a VCR, which controls the servo microcomputer and the on-screen display (OSD) block by calculating a recordable time according to a remaining tape length using a signal from a reel-rotation sensing means and a recording speed in the standard recording mode, and a recording time stored in the memory, comprising the steps of:

obtaining a specific value of dividing the calculated recording time by the recordable time;

comparing the specific value with a predetermined reference;

changing the recording speed when the specific value is equal to or less than the predetermined reference; and driving a warning signal when the specific value exceeds the predetermined reference.

BRIEF DESCRIPTION OF THE DRAWINGS

The above objects and other advantages of the present invention will become more apparent from the following detailed description with reference to the accompanying drawings, in which.

DETAILED DESCRIPTION OF THE INVENTION

Figure 1:
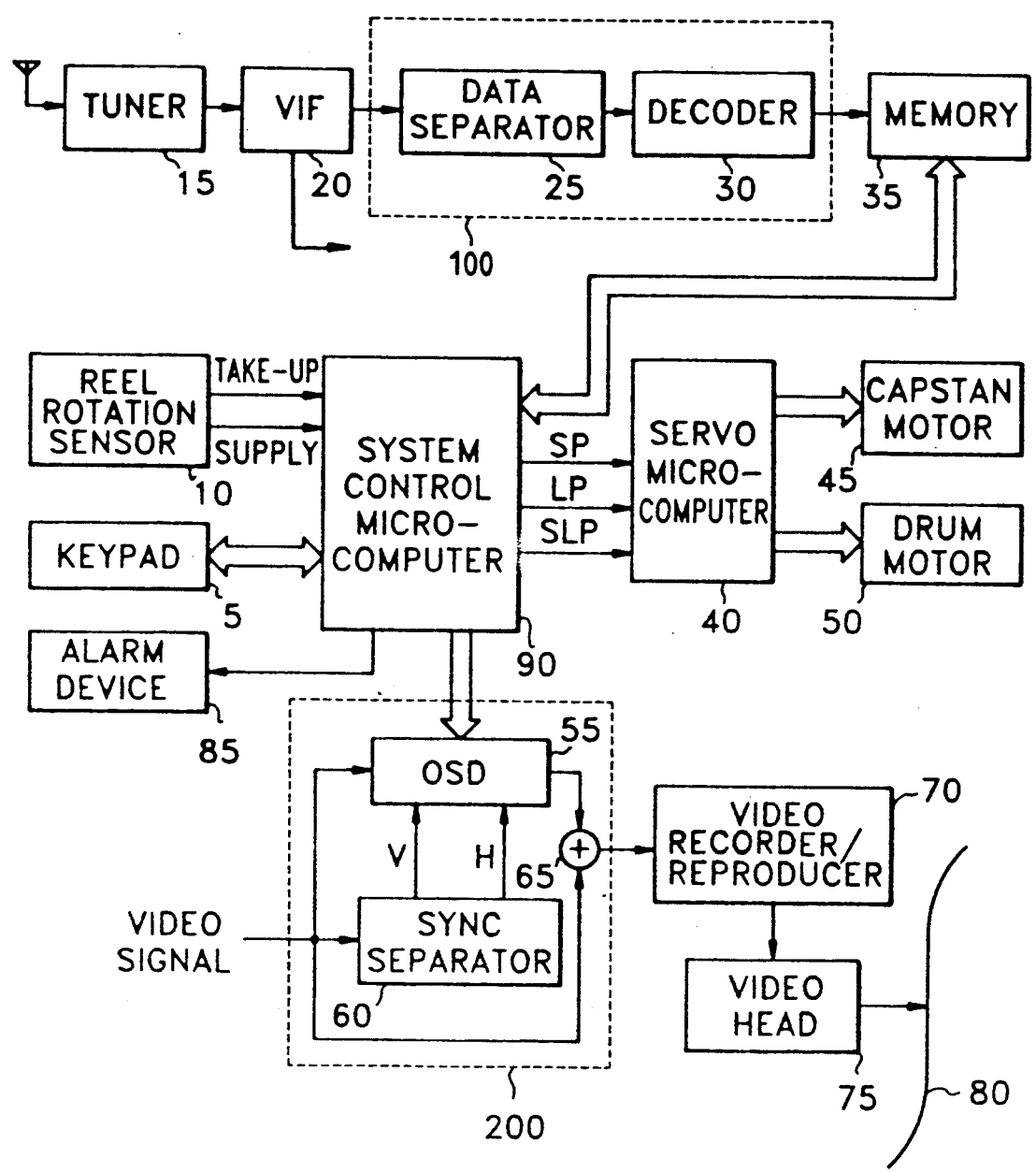
FIG. 1 is a block diagram of an apparatus for automatically adjusting the recording speed of a video cassette recorder (VCR) according to the present invention.

In FIG. 1, an apparatus for automatically adjusting the recording speed of a recorder such as a video cassette recorder (VCR) according to the present invention includes: a memory 35 for storing broadcasting signal data and user-input data; a reel rotation sensor 10 for sensing the states of the take-up reel and supply reel; a system-control microcomputer 90 which calculates a remaining tape length by sensing the pulse input from reel rotation sensor 10, and compares the remaining tape length with data stored in memory 35, thereby controlling the overall device; a servo microcomputer 40 for controlling the rotating speed of motors 45 and 50 in accordance with a control command of system-control microcomputer 90; and a keypad 5 serving as a data input unit for inputting the data used to set the mode of the VCR. Also, the apparatus of the present invention further includes, an alarm device 85 for generating a warning signal to inform the user of incomplete recording; an on-screen display (hereinafter referred to as "OSD") character signal processor 200 for displaying the warning signal; and a broadcasting schedule data processor 100 capable of receiving and processing external broadcasting schedule data.

Referring to FIG. 1, system-control microcomputer 90 receives a key input from keypad 5 which is a data input unit, and then transmits data to tuner 15 via an unshown path so that the same can be tuned with a specific frequency, thereby tuning a specific channel. A broadcasting signal of the specific tuned channel is simultaneously supplied to an unshown video signal processor and a data separator 25 within the broadcasting schedule data processor 100 consisting of data separator 25 and decoder 30 via a video IF processor 20 (hereinafter referred to as "VIF"). Data separator 25 separates the broadcasting schedule data using a well-known technique, and the separated broadcasting schedule data is input to decoder 30, and then converted into a digital signal prior to being stored in memory 35. Here, the broadcasting schedule data represents the name of the broadcasting station, a channel number, the beginning and ending time of a program, and the like, which is superimposed on a broadcasting signal from a broadcasting station. (The broadcasting schedule data is provided in the cable television broadcasting stations for user convenience.) Such broadcasting schedule data is detected by a combination of gates in data separator 25, and then stored in memory 35 via decoder 30. At this time, the user can store the broadcasting schedule data in memory 35 in advance. Also, in case of reserved recording, the program recording time can be obtained by presetting the beginning and ending time of recording.

System-control microcomputer 90 detects the remaining tape length by checking the supply reel pulse and the take-up reel pulse supplied from reel rotations sensor 10 comprising a reflecting plate, photo-coupler, and other well-known components, and outputs speed data for such modes as SP, LP, or SLP, to allow servo microcomputer 40 to control the operation of capstan motor 45. Additionally, system-control microcomputer 90 supplies data to the OSD character signal processor 55 to convert the data into a video signal in an OSD block 55, using horizontal/vertical sync signals separated from the broadcasting video signal in a sync separator 60 within the OSD character signal processor. Thereafter, the video signal is supplied to a mixer 65 to be superimposed on the broadcasting video signal, and the superimposed signal is recorded on a tape 80 via a video recorder/reproducer 70, using a video head 75.

System-control microcomputer 90 controls the operation of alarm device 85 for informing the user of an incomplete recording, and a selecting switch is installed in keypad 5 in order to determine whether or not the function of the present invention is selected.

Figure 2A:
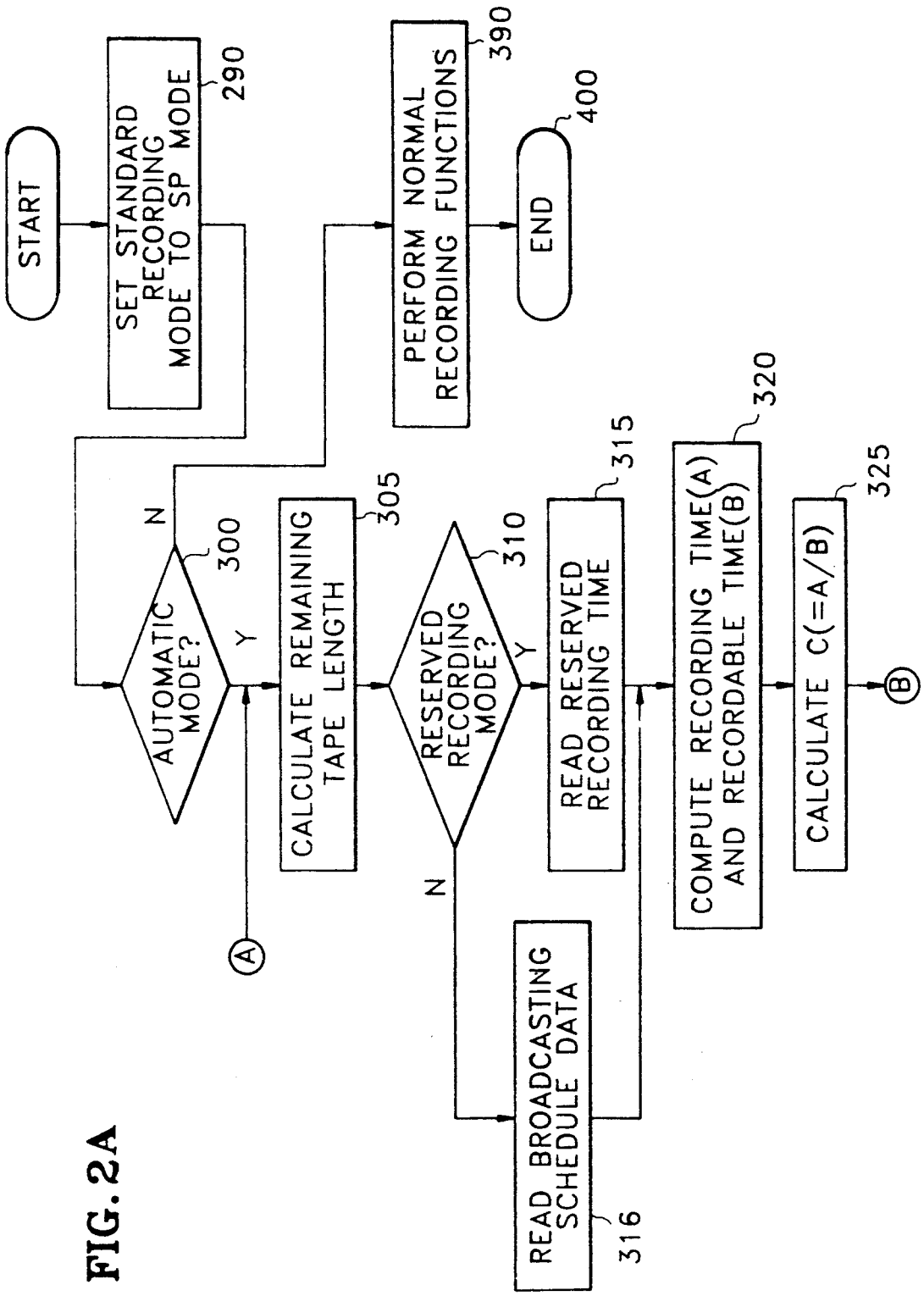
FIGS. 2A and 2B illustrate a procedure for automatically adjusting the recording speed of a VCR according to the present invention.
Figure 2B:
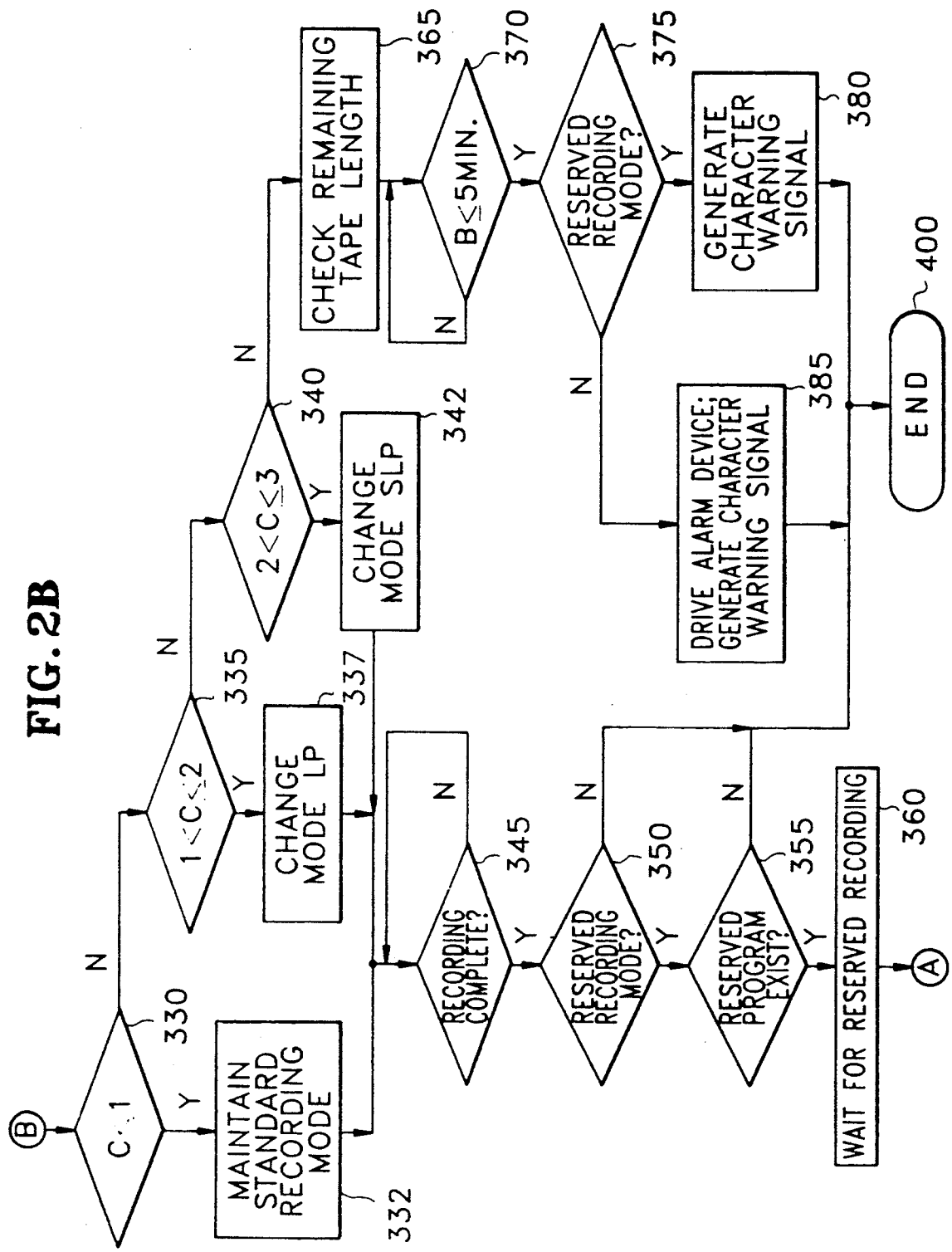

As illustrated in the flowchart of FIGS. 2A and 2B, upon the beginning of recording, the standard recording mode is set to SP mode (step 290), and then system-control microcomputer 90, for controlling the operation of each functional block, determines whether or not an automatic mode, which automatically adjusts the recording speed, is set (step 300). If the automatic mode is not set, the recording operation is carried out unchanged (step 390). Otherwise, when the automatic mode is set, the remaining tape length is calculated (step 305).

That is, when the recording begins and the automatic mode which changes the recording speed according to the remaining tape length is set, system-control microcomputer 90 checks the take-up reel and supply reel pulses and calculates the remaining tape length. Further, along with this calculation, the recording mode is checked to determine whether the present mode is for reserved recording or normal recording (step 310). When the recording mode is the reserved recording mode, the starting and ending time of the reserved recording set by the user is read out to check the reserved recording time (step 315). If the mode is not the reserved recording mode, but the normal recording mode, the broadcasting schedule data stored in memory 35 is read out to check the programmed recording time (step 316).

After checking the tape's remaining length and the programmed recording time as described above, a recordable time B, according to the determined length of the remaining tape and the standard recording mode (SP), and a recording time A, according to the programmed recording time or the broadcasting schedule, are computed (step 320), such that a specific value C is calculated by dividing recording time A by recordable time B (step 325) and checked in accordance with predetermined references (steps 330, 335, 340).

When specific value C is less than or equal to one (1), the remaining tape length is at least as long as recording time A, so that the recording speed of the standard mode SP is selected (steps 330, 332). When specific value C is greater than one (1), but less than or equal to two (2), the remaining tape length is short as compared with recording time A, and thus, the recording speed is changed to the LP mode (steps 335, 337). When specific value C is greater than two (2), but less than or equal to three (3), the length of the remaining tape is much shorter than recording time A, and so the recording speed is changed to the SLP mode (steps 340, 342).

As described above, when there is sufficient remaining tape length relative to recording time A, the recording speed stays unchanged. On the other hand, in case the remaining tape length is short, the recording speed is changed and the recording mode is maintained while checking for the completion of the recording. Then, when the recording is completed (step 345), the mode is again checked whether it is the reserved recording mode or not (step 350). If it is not the reserved recording mode, the program is finished (step 400). Otherwise, when the mode is the reserved recording mode, it is checked whether there is a reserved program or not (step 355). When the reserved program exists, the reserved recording is prepared (step 360) and then the procedure returns to step 305. Otherwise, the program is finished (step 400).

Therefore, since the recording is performed while changing the recording speed in accordance with the tapes remaining length, the problem of the failure to record the entire program due to a shortage of tape is solved.

Meanwhile, when the remaining tape is short even after changing the recording speed to the SLP mode (when C>3), the remaining tape length is checked (step 365) until the time to the end of the tape is five minutes (step 370). At five minutes to the end of the tape, the recording mode is checked as to whether it is the reserved mode or not (step 375). If the reserved recording mode is selected, a character warning signal is generated to OSD block 55, and the character warning is recorded on the tape (step 380). If the reserved mode is not selected, alarm device 85 is operated while supplying character warning data to OSD block 55, thereby notifying the user (step 385).

In other words, although the recording is being carried out by the SLP mode, when the remaining tape length is short and the mode is the reserved recording, the character warning signal (e.g., "remaining tape length is short"), is recorded on the tape by being supplied to OSD block 55 at five minutes before the ending of the tape, so that the user is aware of the program's incomplete recording due to the shortage of tape by reading the character warning signal during reproducing.

When the remaining tape length is short in the SLP mode and the recording mode is normal, alarm device 85 is driven at five minutes before the ending of the tape, or the character warning signal is output to OSD block 55, and the character warning is displayed on a monitor. Therefore, the user can recognize the shortage of remaining tape. Accordingly, the user is able to replace the cassette and complete the recording of the program.

In the present invention as described above, while recording the program, the recordable time according to the remaining length and the standard mode (SP) is compared with the reserved recording time, and the recording speed is adjusted according to the compared value using predetermined references. As a result, the problem of incomplete recording due to a shortage of remaining tape is eliminated. Further, when the remaining tape length is still short while recording at the slowest speed, the shortage of the remaining tape is indicated.

What is claimed is:

1. An apparatus for automatically adjusting the recording speed of a recorder, the apparatus comprising:
    reel rotation sensing means for sensing the states of a take-up reel and a supply reel of a recording medium in the recorder;
    data input means for inputting data and setting a mode;
    a broadcast schedule data processor for receiving and decoding broadcast schedule data so as to provide beginning and ending time data;
    a memory for storing said data input from said data input means and for storing the beginning and ending time data;
    a system-control microcomputer for calculating a remaining length of the recording medium in accordance with an output signal from said reel-rotation sensing means, and outputting a signal for controlling a recording mode of the recorder by comparing the remaining length with said beginning and ending time data stored in said memory; and
    a servo microcomputer for driving motors which automatically control at least one of the take-up and supply reels in accordance with said control signal from said system-control microcomputer.

2. The apparatus for automatically adjusting the recording speed of a recorder as claimed in claim 1, wherein said broadcasting schedule data processor is operable for processing said data stored in said memory when said stored data is broadcasting schedule data input from a broadcasting signal, said data processor includes a data separator for separating said broadcasting schedule data from said broadcasting signal; and
    a decoder for outputting a digitized signal to said memory by decoding said separated data.

3. The apparatus for automatically adjusting the recording speed of a recorder as claimed in claim 1, further comprising alarm means for generating a warning signal under the control of said system control microcomputer when said remaining recording medium length is short while recording at a slowest speed of the recorder.

4. The apparatus for automatically adjusting the recording speed of a recorder as claimed in claim 3, wherein said warning signal is generated at a predetermined time before the ending of the recording medium.

5. The apparatus for automatically adjusting the recording speed of a recorder as claimed in claim 1, further comprising:
    an on-screen display character signal processor for displaying a warning signal on a monitor when said remaining recording medium length is short in spite of recording at a slowest speed of the recorder, said processor includes a sync separator for separating vertical and horizontal sync signals from a broadcasting video signal;
    an OSD block for forming an OSD character video signal using said video signal, said vertical and horizontal sync signals separated in said sync separator, and an OSD data from said system-control microcomputer; and
    a mixer for superimposing the output signal from said OSD block on said video signal.

6. The apparatus for automatically adjusting the recording speed of a recorder as claimed in claim 5, wherein said warning signal is generated at a predetermined time before the ending of the recording medium.

7. The apparatus for automatically adjusting the recording speed of a recorder of claim 6, wherein the recording medium is a video cassette tape and the recorder is a video cassette recorder.

8. A method of automatically adjusting the recording speed of a recorder, which controls a servo microcomputer and an on-screen display (OSD) block by calculating a recordable time according to a remaining length of a recording medium by a signal from a reel rotation sensing means and a recording speed by the standard recording mode SP, and a recording time stored in a memory, the method comprising the steps of:
    storing said recording time in said memory after decoding received broadcast schedule data;
    obtaining a specific value by dividing said recording time by the recordable time;
    comparing said specific value with a predetermined reference value;
    automatically changing said recording speed when said specific value is equal to or less than said predetermined reference; and driving a warning signal when said specific value exceeds said predetermined reference.

9. The method of automatically adjusting the recording speed of a recorder as claimed in claim 8, wherein said recording speed changing step further comprises the steps of:

maintaining said standard recording mode SP when said specific value is less than one;

changing said mode into an LP mode when said specific value is greater than one but less than or equal to two; and changing said mode into an SLP mode when said specific value is greater than two but less than or equal to three.

10. The method of automatically adjusting the recording speed of a recorder as claimed in claim 9, wherein the recording medium is a video cassette tape and the recorder is a video cassette recorder.

11. A method of automatically adjusting the recording speed of a recorder, which controls a servo microcomputer and an on-screen display (OSD) block by calculating a recordable time according to a remaining length of a recording medium by a signal from a reel rotation sensing means and a recording speed by the standard recording mode SP, and a recording time stored in a memory, the method comprising the steps of:

obtaining a specific value by dividing the calculated recording time by the recordable time;

comparing said specific value with a predetermined reference value;

changing said recording speed when said specific value is equal to or less than said predetermined reference; and driving a warning signal when said specific value exceeds said predetermined reference, wherein said warning signal driving step further comprises the steps of:

determining the shortage of said remaining medium length when said specific value exceeds three;

generating a character warning signal, and recording said character warning signal with an indicator signal when said remaining length is short and the recording is in a reserved mode; and driving an alarm means and displaying the character warning signal on a monitor when said remaining length is short and said recording mode is not said reserved mode.

* * * * *